(12) United States Patent
Sadana et al.

(10) Patent No.: US 9,051,819 B2
(45) Date of Patent: Jun. 9, 2015

(54) METHOD AND APPARATUS FOR SELECTIVELY CONTROLLING FLUID FLOW

(75) Inventors: Anil K. Sadana, Houston, TX (US); Jiaxiang Ren, Houston, TX (US); Ping Duan, Cypress, TX (US); David P. Gerrard, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 889 days.

(21) Appl. No.: 13/214,795

(22) Filed: Aug. 22, 2011

(65) Prior Publication Data

US 2013/0048129 A1 Feb. 28, 2013

(51) Int. Cl.
*E21B 43/02* (2006.01)
*E21B 43/12* (2006.01)
*E21B 43/38* (2006.01)
*F16L 55/027* (2006.01)

(52) U.S. Cl.
CPC ............... *E21B 43/02* (2013.01); *E21B 43/12* (2013.01); *E21B 43/38* (2013.01); *F16L 55/027* (2013.01)

(58) Field of Classification Search
USPC .............. 210/787, 512.1, 304, 502.1; 166/51, 166/278, 236, 228; 138/40, 42; 137/9, 13, 137/172, 808
See application file for complete search history.

(56) References Cited

U.S. PATENT DOCUMENTS

| | | | |
|---|---|---|---|
| 4,241,787 A | 12/1980 | Price | |
| 6,109,350 A | 8/2000 | Nguyen et al. | |
| 6,641,738 B2 * | 11/2003 | Hard | 210/502.1 |
| 8,616,272 B2 | 12/2013 | Mazyar et al. | |
| 2008/0236843 A1 | 10/2008 | Scott et al. | |
| 2009/0095484 A1 | 4/2009 | Huang et al. | |
| 2009/0095487 A1 | 4/2009 | Xu et al. | |
| 2009/0101329 A1 | 4/2009 | Clem et al. | |
| 2009/0101341 A1 | 4/2009 | Willauer | |
| 2009/0101342 A1 | 4/2009 | Gaudette et al. | |
| 2009/0101344 A1 | 4/2009 | Crow et al. | |
| 2009/0101352 A1 | 4/2009 | Coronado et al. | |
| 2009/0101353 A1 | 4/2009 | Crow et al. | |
| 2009/0101354 A1 | 4/2009 | Holmes et al. | |
| 2009/0101355 A1 | 4/2009 | Peterson et al. | |
| 2009/0205834 A1 | 8/2009 | Garcia et al. | |
| 2009/0236102 A1 | 9/2009 | Guest et al. | |
| 2009/0277650 A1 | 11/2009 | Casciaro et al. | |
| 2010/0028145 A1 | 2/2010 | Young et al. | |

(Continued)

FOREIGN PATENT DOCUMENTS

WO 0166910 A1 9/2001

OTHER PUBLICATIONS

A. Satyaprasad, et al., "Deposition of super hydrophobic nanostructured Teflon-like coating using expanding plasma arc", ScienceDirect, Applied Surface Science 253 (2007), pp. 5462-5466.

(Continued)

*Primary Examiner* — David A Reifsnyder

(74) *Attorney, Agent, or Firm* — Cantor Colburn LLP

(57) ABSTRACT

A flow control device and a method of controlling a flow, the flow control device including a flow path for a fluid therethrough and a material at least partially defining the flow path, the material operatively arranged with a surface energy less than that of the fluid for passively impeding an undesirable component of the fluid more than a desirable component of the fluid.

19 Claims, 3 Drawing Sheets

(56) References Cited

U.S. PATENT DOCUMENTS

| | | |
|---|---|---|
| 2010/0038086 A1 | 2/2010 | Bunnell et al. |
| 2011/0005752 A1 | 1/2011 | Huang et al. |
| 2011/0030956 A1 | 2/2011 | Choban et al. |
| 2011/0079384 A1 | 4/2011 | Russell et al. |
| 2011/0079387 A1 | 4/2011 | Russell et al. |
| 2011/0079396 A1 | 4/2011 | Russell et al. |
| 2013/0048081 A1* | 2/2013 | Agrawal et al. .................. 137/1 |

OTHER PUBLICATIONS

H.A. Nasr-El-Din et al., "Surface Tension of Completion Brines", SPE 93421, pp. 1-13, Copyright 2005, Society of Petroleum Engineers Inc., This paper was prepared for presentation at the 2005 SPE International Symposium on Oilfield Chemistry held in Houston, Texas, Feb. 2-4, 2005.

Michael E. Conway et al., "The Effect of Surface Active Agents on the Relative Permeability of Brine and Gas in Porous Media", SPE 28982, pp. 395-401, Copyright 1995, Society of Pretroleum Engineers, Inc., This paper was prepared for presentation at the SPE International Aymposium on Oilfield Chemistry held in San Antonio, TX, Feb. 14-17, 1995.

Pingping Shen et al., "The Influence of Interfacial Tension on Water-Oil Two-Phase Relative Permeability", SCA2005-68, pp. 1-7, This paper was prepared for presentation at the International Symposium of the Society of Core Analysts held in Toronto, Canada, Aug. 21-25, 2005.

International Search Report and Written Opinion; International Application No. PCT/US2012/051141; International Filing Date: Aug. 16, 2012; Date of Mailing: Feb. 26, 2013; 10 pages.

International Search Report and Written Opinion; International Application No. PCT/US2012/051143; International Filing Date: Aug. 16, 2012; Date of Mailing: Feb. 25, 2013; 12 pages.

\* cited by examiner

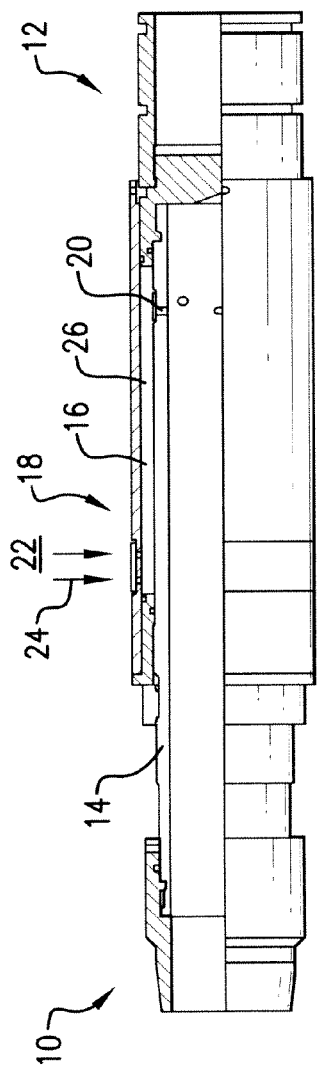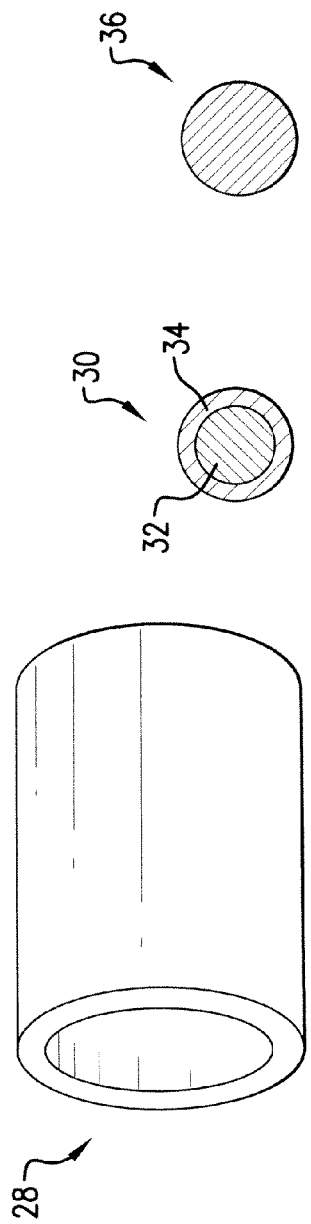

METHOD AND APPARATUS FOR SELECTIVELY CONTROLLING FLUID FLOW

BACKGROUND

Downhole completions are often used to produce or harvest fluids, e.g., hydrocarbons, from subterranean reservoirs, formations, or production zones. There are often undesirable fluids, e.g., water or brine, also located downhole. As a result, inflow control devices have been contemplated for limiting production of the undesirable fluids in order to maximize the yield of the desirable fluids. Although useful for impeding some amount of water or other undesirable fluid flow, current inflow control devices only partially reduce the flow of undesirable fluids. Accordingly, advances in inflow control devices and other systems and methods for limiting undesirable fluid flow into a downhole production assembly are well received by the industry.

BRIEF DESCRIPTION

A flow control device including a flow path for a fluid therethrough and a material at least partially defining the flow path, the material operatively arranged with a surface energy less than that of the fluid for passively impeding an undesirable component of the fluid more than a desirable component of the fluid.

A flow control device including a flow path for a fluid therethrough; and a material at least partially defining the flow path, the material operatively arranged to be wettable by a desirable component of the fluid and not wettable by an undesirable component of the fluid for passively impeding an undesirable component of the fluid more than a desirable component of the fluid.

A method of controlling a flow of fluid including flowing a fluid through or past a material at least partially defining a flow path, the material operatively arranged with a surface energy less than that of the fluid for passively impeding an undesirable component of the fluid more than a desirable component of the fluid.

BRIEF DESCRIPTION OF THE DRAWINGS

The following descriptions should not be considered limiting in any way. With reference to the accompanying drawings, like elements are numbered alike:

FIG. 1 is a three-quarter-sectional view of a production system having a flow control device;

FIGS. 2A-2C schematically illustrate various embodiments of elements formable from selective flow impeding materials;

DETAILED DESCRIPTION

Figure 3:
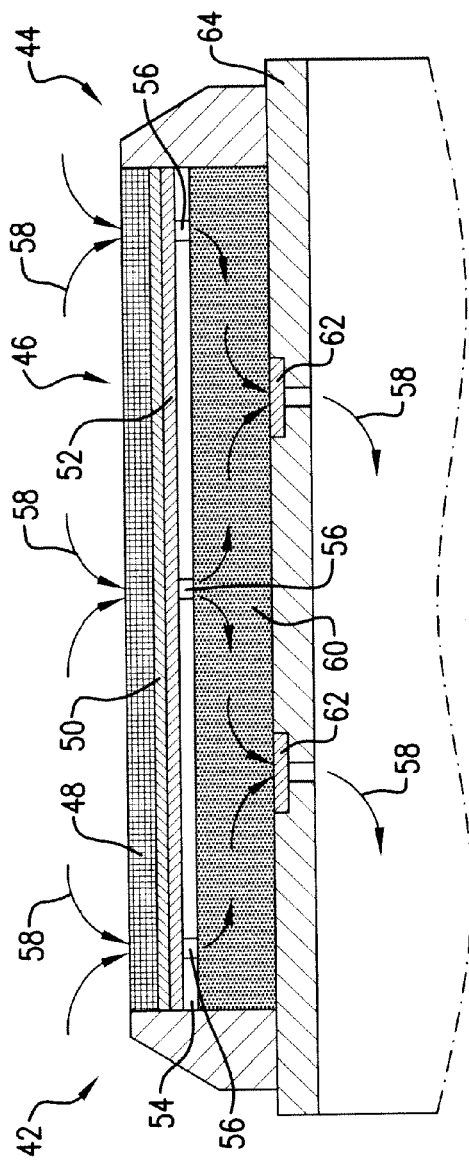
FIG. 3 is a cross-sectional view of an embodiment including a flow control device.

A detailed description of one or more embodiments of the disclosed apparatus and method are presented herein by way of exemplification and not limitation with reference to the Figures.

Referring now to FIG. 1, a production system 10 is shown. The system 10 includes a flow control device 12 for a tubular 14. The flow control device 12 defines a flow path 16 therethrough, the flow path extending between an inlet 18 and an outlet 20. The inlet 18 is in fluid communication with a subterranean reservoir, formation, or production zone 22 for receiving a formation fluid 24. The outlet 20 is in fluid communication with the interior of the tubular 14 for directing the fluid 24 into the tubular 14. The tubular 14 is, for example, a base pipe or other member of a production string arranged for pumping the formation fluid to the surface from a subterranean location. That is, for example, the production system 10 is installed in a borehole drilled through the earth proximate one or more production zones or reservoirs, e.g., the zone 22, where a formation fluid is stored, e.g., the fluid 24. For example, the formation fluid 24 may include oil, hydrocarbons, or some other desirable fluid component, the production of which is intended.

The flow control device 12 is used generally to govern one or more aspects of flow of one or more fluids from the production zones 22 into the tubular 14. One or more flow control devices could be included in a production system, orientated either vertically or horizontally. As used herein, the term "fluid" or "fluids" generally includes liquids, gases, hydrocarbons, multi-phase fluids, mixtures of two of more fluids, water, and fluids injected from the surface, such as water. Additionally, references to water should be construed to also include water-based fluids, e.g., brine or salt water. Subsurface formations typically contain water, brine, or other undesirable fluids along with oil or other desirable fluids. For the sake of discussion "water" may be used to generally represent any undesirable fluid, while "oil" may be used to generally represent any desirable fluid, although other fluids may be desirable or undesirable in other embodiments. Often, water will begin to flow into some of the flow control devices after formation fluids have been drawn out of a reservoir or production zone for a certain amount of time. The amount and timing of water inflow can vary along the length of the production zone and from zone to zone. It is therefore desirable to have flow control devices that will restrict the flow of undesirable fluids in response to higher percentages of undesirable fluid flow. Thus, the flow control device 12 and devices according to other embodiments disclosed herein are arranged to restrict or impede the water (or other undesirable fluid) component of formation fluid in order to enable a higher percentage of the oil (or other desirable fluid) component to be produced over the life of production zones.

Generally, flow control devices disclosed herein include a selective flow impeding material at least partially defining a flow path for the fluid. That is, the fluid contacts, flows by, or flows through the selective flow impeding material. For example, in the embodiment of FIG. 1, a pack 26 is disposed along the flow path 16. The pack 26 is formed from a selective flow impeding media or material and could be arranged as a bead pack, porous core pack, etc., as described in more detail below. Furthermore, the pack 26 could be replaced by selective flow impeding material coatings on other components of the flow control device 12, other components of the device 12 made from selective flow impeding materials, channels or tubes formed by or lined with selective flow impeding materials, plugs made from selective flow impeding materials disposed in orifices, ports, or openings, or any other features disposed in or at least partially defining the flow path for restricting the flow of water or some other undesirable fluid component through the flow control device, as will be better appreciated in view of the following embodiments and disclosure. Selective flow inhibiting materials are those that will more effectively impede, restrict, or inhibit flow of one fluid component through the pack 26 than another fluid component, based on a property of the fluids. That is, if the formation fluid 24 comprises an oil-water mixture, then the pack 26 will comprise a material that more greatly impedes the passage of water through the flow path 16 than the passage of oil, which is relatively unimpeded (or vice versa).

In one embodiment, the selective flow impeding materials as described herein are low surface energy materials. "Low surface energy" is intended to mean having a surface energy less than about the lowest surface energy component of fluid 24. For example, in the embodiment of an oil/water mixture, the pack 26 would be made from a material having a surface energy less than that of oil. Since the surface energy of oil is much less than that of water, oil will more readily wet a low surface energy material, while water will tend to "stick" together and form droplets or beads at the surface of a low surface energy material. Low surface energy materials include polytetrafluoroethylene (PTFE) and other fluoropolymers and their compounds having surface energies less than that of oil, less than approximately 25 or 30 mN/m.

Alternatively or additionally, selective flow impeding materials could be described as oil wettable, hydrophobic materials. For example, the contact angle of oil on the material of the pack 26 is about 50° or less, while the contact angle for water on the material of the pack 26 is about 90° or more. As is known, generally, a contact angle less than 90° indicates that the fluid at least partially wets the material, while a contact angle more than 90° indicates that the fluid does not wet the material. Accordingly, wider contact angle ranges are also possible. For example a difference of about 55° or more between the contact angles of the desirable and undesirable fluid components may provide some degree water impedance, while differences of about 90° or more provide even better results. In any event, it is to be recognized that the ability of the material to selectively impede flow lessens as the two contact angles become more similar. Accordingly, PTFE is again an example of a material that exhibits good oil wetting and hydrophobic properties, as the relative contact angles for water and oil on PTFE are quite different. Specifically, the contact angle of water and LVT 200 oil on solid PTFE is approximately 135° and 18°, respectively, and approximately 105° and 50°, respectively, on porous PTFE, as measured by the inventors according to the Sessile Drop Technique. LVT 200 oil is used as a representative example only, and it is to be appreciated that other hydrocarbons or hydrocarbon compositions may yield different results. Contact angles are well known and any other suitable means of measuring or determining such angles could be utilized.

The pack 26 and other selective flow impeding media or materials could be arranged in a variety of ways, some of which are illustrated in FIGS. 2A-2C. Specifically, a sleeve 28 is shown in FIG. 2A, comprising a porous core of selective flow impeding material, e.g., PTFE. Porosities of 20-50% for PTFE have shown suitable results, although other porosities are possible. Although shown as a sleeve or hollow cylinder in FIG. 2A, porous cores could take the form of rods, blocks, spheres, etc., or any other desired form depending on the shape and configuration of the flow path in which the core is installed. A bead 30 is shown in FIG. 2B having a core 32, e.g., of a metal, glass, ceramic, or other filler material, and a coating 34 of a selective flow impeding material, e.g. PTFE or other low surface energy or oil wettable, hydrophobic material. A bead 36 is shown in FIG. 2C comprising a sphere, ball, cylinder or other regular or irregular shaped body of selective flow impeding material. The coating 34 and the bead 36 could be porous or non-porous, with the fluids forced to either flow through the beads or around the beads. The beads 30 and 36 could have any desired shape, e.g., spherical, cuboidal, ellipsoidal, cylindrical, irregular, regular, etc. The beads 30 and 36 could similarly be of any desired size.

Another embodiment is shown in FIG. 3, namely, a system 42 including a flow control device 44. The flow control device 42 comprises a filter assembly 46, including, for example, an outer shroud 48, a filter mesh 50, and a drainage layer 52 for filtering particulate from the formation fluid. A convergence shroud 54 is perforated with openings 56 to direct a flow 58 of fluid from the filter assembly 46 into a pack 60. For example, in some embodiments the pack 60 is a bead pack comprising beads made from or coated by a selective flow impeding material, as described above. The beads are held in the pack 60 via a retaining mesh 62. The retaining mesh 62 enables the flow 58 to continue into a tubular 64, e.g., a base pipe or other component of a production string.

Figure 4:
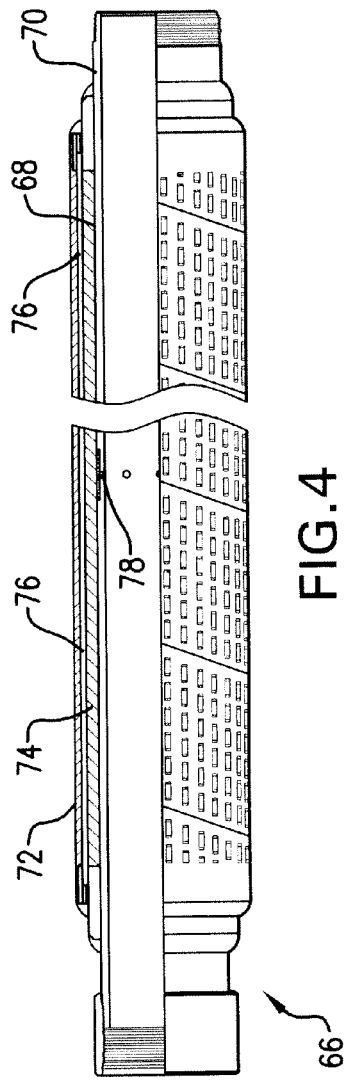
FIG. 4 is a three-quarter-sectional view of an other embodiment of a system including a flow control device.

Referring now to FIG. 4, a system 66 is shown. In the embodiment of system 66, a pack 68 of selective flow impeding material is disposed continuously along a substantial length of a tubular 70. The pack 68 is, for example, a porous core pack such as the sleeve 28 shown in FIG. 2A although it could take other forms, such as a bead pack comprising the beads 30 or 36, etc. A screen 72 or other filtering assembly is disposable radially with the pack 68 for screening particulate before the fluid enters the pack 68. A shroud 74 is included directing fluid flow into the pack 68 via a set of openings 76. The openings 76 are offset from a set of openings 78 in the tubular 70 in order to ensure that the fluid flows through a sufficient portion of the pack 68 to sufficiently impede undesirable fluid flow. Advantageously, the continuous or extended arrangement of the system 66 mimics a cumulative flow of a plurality of discrete packs taken in parallel, while maintaining a constant pressure drop thereacross.

Figure 5:
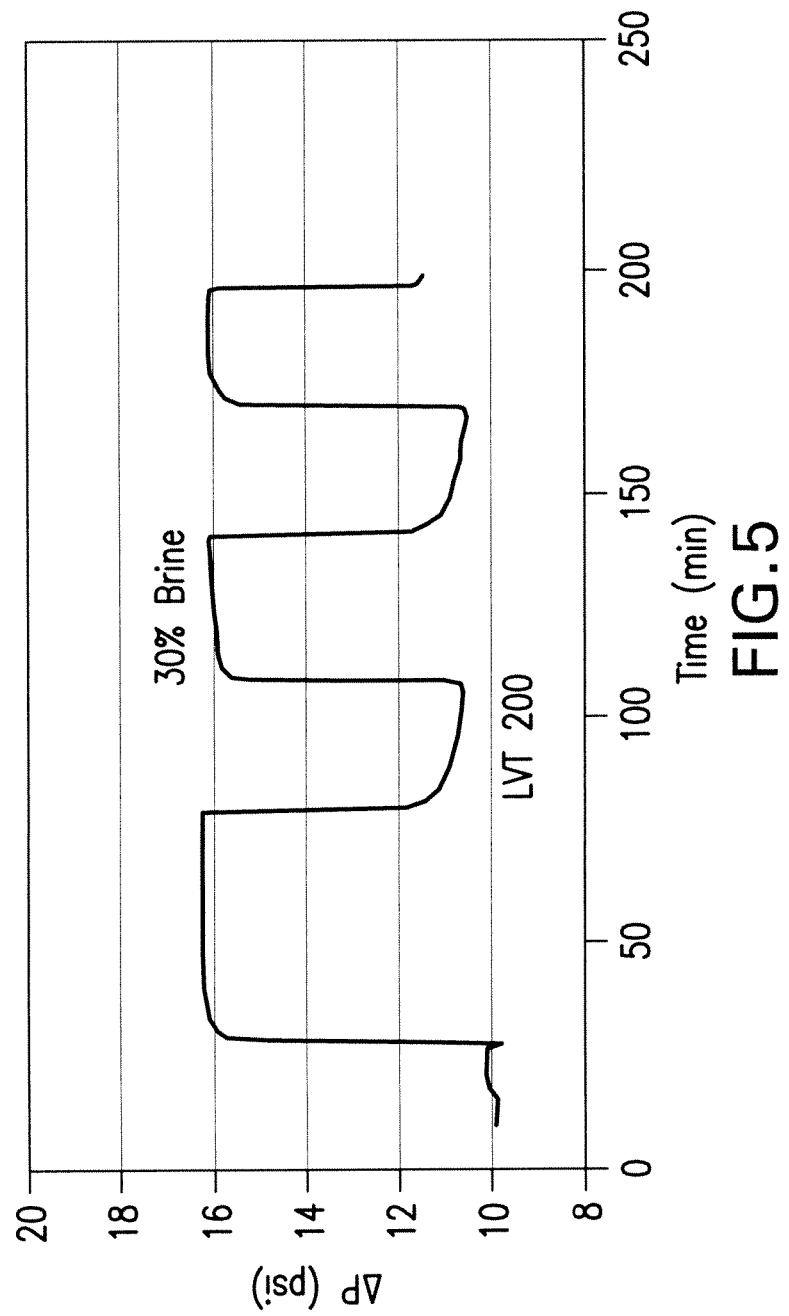
FIG. 5 is a graph showing a change in a pressure drop when alternatingly flowing a pure oil fluid and a 30/70 water-oil mixture through a porous core according to the current invention.

Tests were performed by the inventors to verify the ability of low surface energy, oil wettable, hydrophobic materials to selectively impede water flow in an oil-water mixture, the results of one such test is displayed in FIG. 5. That is, the graph of FIG. 5 illustrates a drop in pressure ($\Delta P$) with respect to time as a first fluid of 100% LVT 200 oil and a second fluid of a 30/70 brine/oil mix are alternately pumped through a 33% porous PTFE rod having a length of 2.636" and a diameter of 0.997". All conditions being constant (with the exception of the fluid composition), the $\Delta P$ is approximately 55-60% higher for the brine/oil mix than for the pure oil flow. Advantageously, this higher drop in pressure reflects that the porous PTFE core impeded the flow to a greater degree when the flow contained a water component. In this way, the flow control devices described herein passively or automatically respond to fluid flows of different compositions by increasingly impeding the flow rate for flows having larger percentages of water.

Of course, different structural embodiments of selective flow impeding materials can be used than those of the examples given herein, e.g., different dimensions, porous or non-porous materials, different porosities, packs comprising sleeves, beads, blocks, coatings, passageways, tubes, etc., or other features made of the proposed or similar materials disposable in a fluid flow path. As other examples, components of a flow control device could be made from or coated by a selective flow impeding material as defined herein. Various arrangements will have different effects on pressure drop and water impedance and may be desired in various embodiments. For example, a single production system may include several selectively closable flow paths with each flow path being arranged for providing a different relative pressure drop thereacross. In view of the foregoing, it is to be appreciated that the test results illustrated in FIG. 5 and the embodiments described with FIGS. 1-4 are intended as examples only and are not to be considered limiting. Advantageously, in any desired or possible arrangement, selective flow impeding materials as defined herein will react passively or automatically in response to flows containing higher percentages of water. That is, flows containing higher percentages of water will result in larger pressure drops across and therefore reduced flow rates through the disclosed flow control devices including packs of selective flow impeding materials.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A flow control device comprising:
   an outer member including a plurality of inlets;
   a tubular arranged radially inwardly of the outer member, the turbular being spaced from the outer member forming a flow path; and
   a flow impeding pack arranged between the outer member and tubular and at least partially defining the flow path, the flow impeding pack being formed from a plurality of beads and operatively arranged with a surface energy less than that of the fluid for passively impeding an undesirable component of the fluid more than a desirable component of the fluid.

2. The flow control device of claim 1, wherein the flow impeding pack is formed as a solid porous core.

3. The flow control device of claim 1, wherein the flow impeding pack is wettable by the desirable component and is not wettable by the undesirable component.

4. The flow control device of claim 1, wherein a first contact angle of the undesirable component on the flow impeding pack is at least about 90° and a second contact angle of the desirable component on the flow impeding pack is at most about 50°.

5. The flow control device of claim 1, wherein a difference between a first contact angle of the undesirable component on the flow impeding pack and a second contact angle of the desirable component on the flow impeding pack is about 55° or more.

6. The flow control device of claim 1, wherein the surface energy of the flow impeding pack is less than about 25 mN/m.

7. The flow control device of claim 1, wherein the fluid comprises hydrocarbons and water.

8. The flow control device of claim 1, wherein the flow impeding pack comprises PTFE, a fluoropolymer, a fluoropolymer compound, or combinations including at least one of the foregoing.

9. The flow control device of claim 1, wherein the PTFE has a porosity of about 20-50%.

10. The flow control device of claim 1, wherein the flow impeding pack is included down a length of a tubular and a screen is disposed radially with the flow impeding pack along the length of the tubular.

11. The flow control device of claim 10, wherein the flow path is defined through a first set of openings and a second set of openings, the first set and second set of openings located on opposite radial sides of the flow impeding pack.

12. The flow control device of claim 11, wherein the first set of openings are axially offset from the second set of openings.

13. The flow control device of claim 1, wherein the undesirable component includes water and the desirable component includes oil.

14. A flow control device comprising:
    a flow path for a fluid therethough; and
    a flow impeding pack formed from a plurality of beads at least partially defining the flow path, the flow impeding pack operatively arranged to be wettable by a desirable component of the fluid and not wettable by an undesirable component of the fluid for passively impeding an undesirable component of the fluid more than a desirable component of the fluid.

15. The flow control device of claim 14, wherein a first contact angle of the undesirable component on the flow impeding pack is at least about 90° and a second contact angle of the desirable component on the material is at most about 50°.

16. A method of controlling a flow of fluid comprising:
    flowing a fluid through or past a flow impeding pack formed from a plurality of beads at least partially defining a flow path, the flow impeding pack operatively arranged with a surface energy less than that of the fluid for passively impeding an undesirable component of the fluid more than a desirable component of the fluid.

17. The method of claim 16, wherein flowing the fluid through the flow impeding pack comprises wetting the material with a desirable component of the fluid and not wetting the material with an undesirable component of the fluid.

18. The method of claim 16, wherein a first contact angle of an undesirable component of the fluid on the flow impeding pack is at least about 90° and a second contact angle of a desirable component of the fluid on the flow impeding pack is at most about 50°.

19. The method of claim 16, further comprising filtering the fluid before flowing the fluid through the flow impeding pack.

* * * * *